US006058190A

United States Patent [19]

Cordery et al.

[11] Patent Number: 6,058,190

[45] Date of Patent: May 2, 2000

[54] METHOD AND SYSTEM FOR AUTOMATIC RECOGNITION OF DIGITAL INDICIA IMAGES DELIBERATELY DISTORTED TO BE NON READABLE

[75] Inventors: Robert A. Cordery, Danbury; Leon A. Pintsov, West Hartford; Claude Zeller, Monroe, all of Conn.

[73] Assignee: Pitney Bowes Inc., Stamford, Conn.

[21] Appl. No.: 08/827,982

[22] Filed: May 27, 1997

[51] Int. Cl.[7] .......... H04L 9/00

[52] U.S. Cl. .......... 380/51

[58] Field of Search .......... 380/51, 25; 705/60, 705/62, 401, 410

[56] References Cited

U.S. PATENT DOCUMENTS

| | | | |
|---|---|---|---|
| 3,978,457 | 8/1976 | Check, Jr. et al. | 340/172.5 |
| 4,168,533 | 9/1979 | Schwartz | 364/900 |
| 4,301,507 | 11/1981 | Soderberg et al. | 364/464 |
| 4,579,054 | 4/1986 | Buan et al. | 101/91 |
| 4,660,221 | 4/1987 | Dlugos | 380/51 |
| 4,725,718 | 2/1988 | Sansone et al. | 380/51 |
| 4,757,537 | 7/1988 | Edelmann et al. | 380/51 |
| 4,775,246 | 10/1988 | Edelmann et al. | 380/23 |
| 4,796,193 | 1/1989 | Pitchenik | 364/464 |
| 5,293,319 | 3/1994 | DeSha et al. | 364/464.02 |
| 5,375,172 | 12/1994 | Wojciech | 380/51 |
| 5,612,889 | 3/1997 | Pintsov et al. | 364/478.14 |
| 5,671,282 | 9/1997 | Wolff et al. | 380/51 |
| 5,680,463 | 10/1997 | Windel et al. | 380/51 |
| 5,974,147 | 10/1999 | Cordery et al. | 380/25 |

OTHER PUBLICATIONS

*A Practical Guide to Neural Nets*, McCord–Nelson and W. T. Illingsworth, 1991.

*Handbook of Pattern Recognition and Image Processing*, T. Y. Young, K–Sun Fu, 1986.

Information Based Indicium Program dated Jun. 13, 1996 USPS.

*Primary Examiner*—Salvatore Cangialosi

*Attorney, Agent, or Firm*—Charles R. Malandra, Jr.; Michael E. Melton; David E. Pitchenik

[57] ABSTRACT

A method and system for processing mail pieces or substrates containing data printed thereon involves scanning a mail piece or substrate and obtaining information concerning the printed data. The information is processed to determine if the data is readable. Non readable data information is processed to determine if the non readable data is due to predetermined causes of a first type or predetermined causes of a second type. Substrates or mail pieces with non readable data due to predetermined causes of the first type may be processed in a first manner and processing substrates or mail pieces with non readable data due to predetermined causes of the second type may be processed in a second manner. The printing may be optical character recognizable, bar code of any type or any other form of printed data.

8 Claims, 5 Drawing Sheets

METHOD AND SYSTEM FOR AUTOMATIC RECOGNITION OF DIGITAL INDICIA IMAGES DELIBERATELY DISTORTED TO BE NON READABLE

FIELD OF THE INVENTION

The present invention relates to printing and verifying images and, more particularly, to printing and verifying digital indicia, such as those used for proof of postage payment or other value printing applications.

BACKGROUND OF THE INVENTION

In mail preparation, a mailer prepares a mailpiece or a series of mailpieces for delivery to a recipient by a carrier service such as the United States Postal Service or other postal service or a private carrier delivery service. The carrier services, upon receiving or accepting a mailpiece or a series of mailpieces from a mailer, processes the mailpiece to prepare it for physical delivery to the recipient. Payment for the postal service or private carrier delivery service may be made by means of value metering devices such as postage meters. In systems of this type, the user prints an indicia, which may be a digital token or other evidence of payment on the mailpiece or on a tape that is adhered to the mailpiece. The postage metering systems print and account for postage and other unit value printing such as parcel delivery service charges and tax stamps.

These postage meter systems involve both prepayment of postal charges by the mailer (prior to postage value imprinting) and post payment of postal charges by the mailer (subsequent to postage value imprinting). Prepayment meters employ descending registers for securely storing value within the meter prior to printing whole post payment (current account) meters employ ascending registers account for value imprinted. Postal charges or other terms referring to postal or postage meter or meter system as used herein should be understood to mean charges for either postal charges, tax charges, private carrier charges, tax service or private carrier service, as the case may be, and other value metering systems, such as certificate metering systems such as is disclosed in U.S. Patent Application of Cordery, Lee, Pintsov, Ryan and Weiant, Ser. No. 08/518,404, filed Aug. 21, 1995, for SECURE USER CERTIFICATION FOR ELECTRONIC COMMERCE EMPLOYING VALUE METERING SYSTEM assigned to Pitney Bowes, Inc. Mail pieces as used herein includes both letters of all types and parcels of all types.

Some of the varied types of postage metering systems are shown, for example, in U.S. Pat. No. 3,978,457 for MICRO COMPUTERIZED ELECTRONIC POSTAGE METER SYSTEM, issued Aug. 31, 1976; U.S. Pat. No. 4,301,507 for ELECTRONIC POSTAGE METER HAVING PLURAL COMPUTING SYSTEMS, issued Nov. 17, 1981; and U.S. Pat. No. 4,579,054 for STAND ALONE ELECTRONIC MAILING MACHINE, issued Apr. 1, 1986. Moreover, the other types of metering systems have been developed which involve different printing systems such as those employing thermal printers, ink jet printers, mechanical printers and other types of printing technologies. Examples of some of these other types of electronic postage meters are described in U.S. Pat. No. 4,168,533 for MICROCOMPUTER MINIATURE POSTAGE METER, issued Sep. 18, 1979; and U.S. Pat. No. 4,493,252 for POSTAGE PRINTING APPARATUS HAVING A MOVABLE PRINT HEAD AN A PRINT DRUM, issued Jan. 15, 1985. These systems enable the postage meter to print variable information, which may be alphanumeric and graphic type information.

Postage metering systems have also been developed which employ encrypted information on a mailpiece. The postage value for a mailpiece may be encrypted together with the other data to generate a digital token. A digital token is encrypted information that authenticates the information imprinted on a mailpiece such as postage value. Examples of postage metering systems which generate and employ digital tokens are described in U.S. Pat. No. 4,757,537 for SYSTEM FOR DETECTING UNACCOUNTED FOR PRINTING IN A VALUE PRINTING SYSTEM, issued Jul. 12, 1988; U.S. Pat. No. 4,831,555 for SECURE POSTAGE APPLYING SYSTEM, issued May 15, 1989; U.S. Pat. No. 4,775,246 for SYSTEM FOR DETECTING UNACCOUNTED FOR PRINTING IN A VALUE PRINTING SYSTEM, issued Oct. 4, 1988; U.S. Pat. No. 4,725,718 for POSTAGE AND MAILING INFORMATION APPLYING SYSTEMS, issued Feb. 16, 1988. These systems, which may utilize a device termed a Postage Evidencing Device (PED) or Postal Security Device (PSD), employ an encryption algorithm to encrypt selected information to generate the digital token. The encryption of the information provides data integrity to prevent altering of the printed information in a manner such that any change in a postal revenue block is detectable by appropriate verification procedures.

Encryption systems have also been proposed where accounting for postage payment occurs at a time subsequent to the printing of the postage. Systems of this type are disclosed in U.S. Pat. No. 4,796,193 for POSTAGE PAYMENT SYSTEM FOR ACCOUNTING FOR POSTAGE PAYMENT OCCURS AT A TIME SUBSEQUENT TO THE PRINTING OF THE POSTAGE AND EMPLOYING A VISUAL MARKING IMPRINTED ON THE MAILPIECE TO SHOW THAT ACCOUNTING HAS OCCURRED, issued Jan. 3, 1989; U.S. Pat. No. 5,293,319 for POSTAGE METERING SYSTEM, issued Mar. 8, 1994; and, U.S. Pat. No. 5,375,172, for POSTAGE PAYMENT SYSTEM EMPLOYING ENCRYPTION TECHNIQUES AND ACCOUNTING FOR POSTAGE PAYMENT AT A TIME SUBSEQUENT TO THE PRINTING OF THE POSTAGE, issued Dec. 20, 1994.

Other postage payment systems have been developed not employing encryption. Such a system is described in U.S. Pat. No. 5,391,562 for SYSTEM AND METHOD FOR PURCHASE AND APPLICATION OF POSTAGE USING PERSONAL COMPUTER, issued Feb. 21, 1995. This patent describes a systems where end-user computers each include a modem for communicating with a computer and a postal authority. The system is operated under control of a postage meter program which causes communications with the postal authority to purchase postage and updates the contents of the secure non-volatile memory. The postage printing program assigns a unique serial number to every printed envelope and label, where the unique serial number includes a meter identifier unique to that end user. The postage printing program of the user directly controls the printer so as to prevent end users from printing more that one copy of any envelope or label with the same serial number. The patent suggests that by capturing and storing the serial numbers on all mailpieces, and then periodically processing the information, the postal service can detect fraudulent duplication of envelopes or labels. In this system, funds are accounted for by and at the mailer site. The mailer creates and issues the unique serial number which is not submitted to the postal service prior to mail entering the postal service mail processing stream. Moreover, no assistance is provided to enhance the deliverability of the mail beyond current existing systems.

Another system not employing encryption of the indicium is disclosed in U.S. Pat. No. 5,612,889 for MAIL PROCESSING SYSTEM WITH UNIQUE MAILPIECE AUTHORIZATION ASSIGNED IN ADVANCE OF MAILPIECES ENTERING CARRIER SERVICE MAIL PROCESSING STREAM.

As can be seen from the references noted above, various postage meter designs may include electronic accounting systems which may be secured within a meter housing or smart cards or other types of portable accounting systems.

Recently, the United States Postal Service has published proposed draft specifications for future postage payment systems, including the Information Based Indicium Program (IBIP) Indicium Specification dated Jun. 13, 1996 and the Information Based Indicia Program Postal Security Device Specification dated Jun. 13, 1996. These are Specifications disclosing various postage payment techniques including various types of secure accounting systems that may be employed, as for example, a single chip module, multi chip module, and multi chip stand alone module (See for example, Table 4.6-1 PSD Physical Security Requirements, Page 4—4 of the Information Based Indicia Program Postal Security Device Specification).

The use of encrypted indicia involve the use of various verification techniques to insure that the indicia is valid. This may be implemented via machine reading the indicia and subsequent validation. Alternatively, the encrypted indicia data may be human readable and thereafter manually entered into a computing system for validation. The nature of the validation process requires the retrieval of sufficient data to execute the validation process. A problem with validation exists, however, when the encrypted indicia is defective such that sufficient data necessary for the validation process cannot be obtained either by machine or human reading. This is a case where data available to the verifying party is insufficient for validation of the indicium. Accordingly, a decision must be made as how to further process such mail, either to reject the mail piece or to place the mail piece in the mail delivery stream. A similar situation exists of verifiable (non-encrypted) indicia which are printed by various metering systems. In such systems, the imprinted indicia is verifiable so long as certain indicia characteristics are legible as, for example, tels intention included in the indicia. In such case, the imprinted indicia, if legible, can be compared to stored indicia specimens for the meter system.

SUMMARY OF THE INVENTION

It has been discovered that a system can be implemented to increase the percentage of mail having an encrypted indicia which can be placed in the mail delivery stream without significantly compromising revenue security.

It has been discovered that certain characteristics exist in mail having an encrypted indicia which is illegible which allows for a determination being made to process the mail for delivery due to characteristics of the mail piece without compromising revenue security.

It is an object of the present invention to provide a mechanism for determining the acceptance or rejection of mail into a mail delivery stream.

It is a further objective of the present invention to provide a validation system which allows for processing of both machine readable and non machine readable indicia.

It is yet a further objective of the present invention to distinguish between classes of non machine readable indicia to allow efficient processing of the mail.

It is still a further objective of the present invention to provide a means to distinguish between acceptable and non-acceptable substrates of various types having printing thereon which is illegible.

It is yet another objective of the present invention to provide a process for determining whether defects in the printing of a substrate or mail pieces (as for example in the indicia) are likely to be intentionally created based on neural network processing of data.

With these and other objectives in view, a method embodying the present invention includes processing mail pieces containing data printed thereon scans a mail piece and obtains information concerning the data printed on the mail piece. The information is processed to determine if the data is readable. Non readable data information is processed to determine if the non readable data is due to predetermined causes of a first type or predetermined causes of a second type.

In accordance with a feature of the present invention, a substrate may be used instead of a mail piece and the printed information may be any type of printed information such as a printed indicium. The printing may be optical character recognizable type printing, bar code printing of any type or other types of printing.

In accordance with another feature of the present invention, mail pieces or substrates with non readable data due to the first type of predetermined causes are processed in a first manner and mail pieces or substrates with non readable data due to the second type of predetermined causes are processed in a second manner.

BRIEF DESCRIPTION OF THE DRAWINGS

Reference is now made to the following figures wherein like reference numerals designate similar elements in the various views and in which.

DETAILED DESCRIPTION OF THE PREFERRED EMBODIMENT

General Overview

Figure 1:
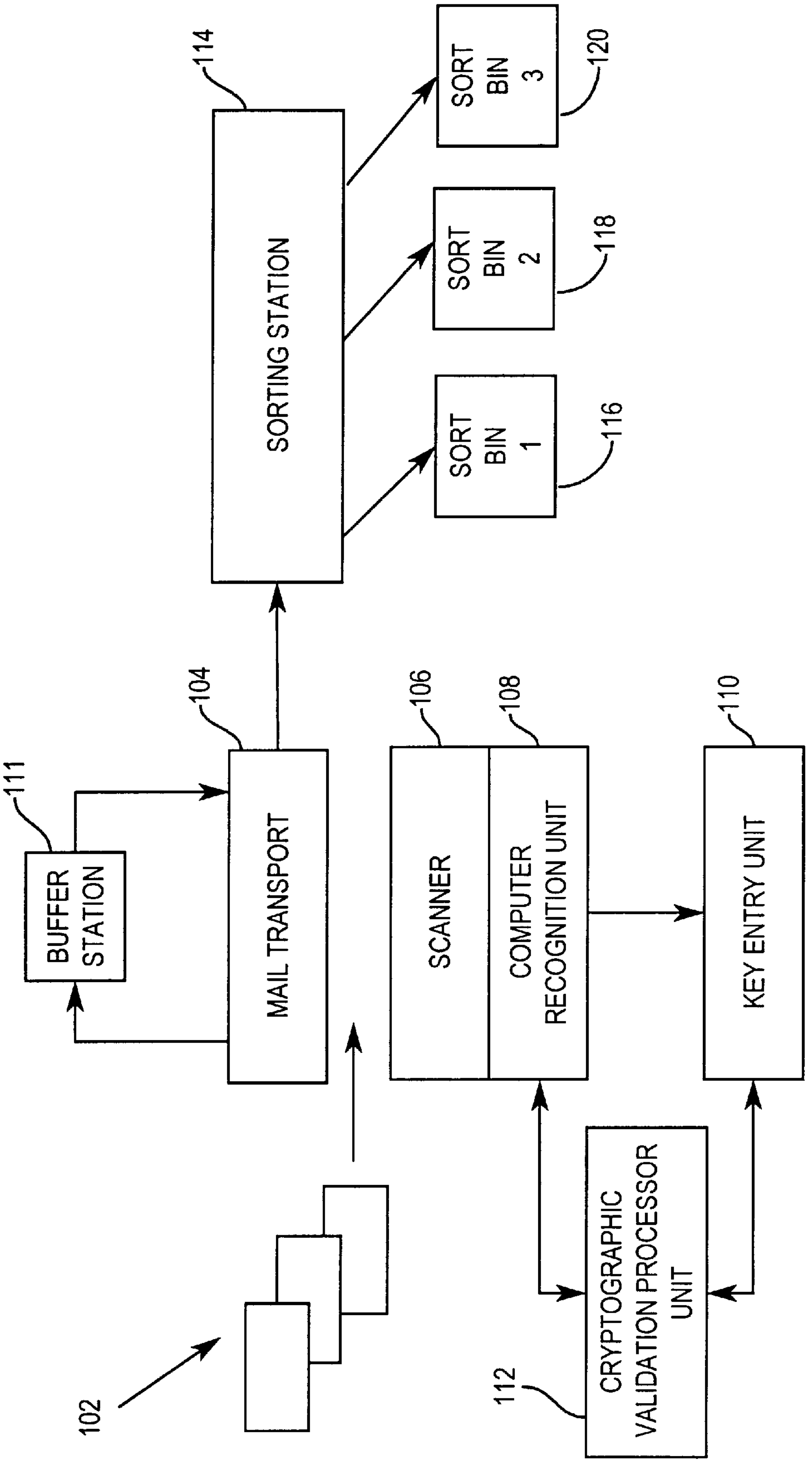
FIG. 1 is a block diagram of a mail validation system incorporating the present invention to increase the percentage of mail pieces which can be properly processed.

The present method allows for automatic recognition of images which were deliberately distorted for the purpose of rendering them to be non readable to avoid detection as counterfeited. The practical significance of this invention lies in the fact that:

a) it allows automatic detection and outsorting of mail pieces with highly probable fraudulent indicia;

b) raises bar for aspired counterfeiters in a sense that it requires more time, knowledge and money to artificially create non readable images which can resemble naturally occurring damaged, but legitimately printed images with high fidelity.

Therefore, the invention closes a potentially wide open loophole in the postage payment system based on digital images incorporating validation codes (digital tokens or truncated ciphertexts), thus creating a secure system trusted by mailers and posts payment system. In the postage payment system which is based on digital images incorporating validation codes (digital tokens or truncated ciphertexts), it is customarily assumed that the verifying party (usually a Postal Administration) can automatically capture and recognize information printed in the digital indicium and validate the indicium authenticity and information integrity by using an appropriate cryptographic algorithm. The rate of error free automatic recognition is assumed to be high due to special data format and error control data in the indicium with which the postage evidencing device (franking machine, a computer printer and the like) prints the indicium. In the case of a reading error, that is the rejection of the indicium as unreadable by the recognition process, it is assumed that there is an error recovery mechanism based on manual key entry of the information in the indicium into the verifying computer. This arrangement opens an opportunity for unscrupulous mailers to test the robustness of the system by printing images of legitimate looking digital indicia artificially distorted to render them both human and machine unreadable. In this case, the verifying party is left with an unpleasant policy decision: should the mail piece be accepted for delivery or rejected based on illegibility of the information in the indicium. There is no logical basis for making such a policy decision: if the indicium is legitimate but of poor quality, then it is paid for, and, the mail piece should be accepted, but there is no confidence that it is legitimate; if the indicium is a counterfeit, then it can be rejected or investigated but there is no confidence that it is counterfeit. This dilemma emphasizes the need to find a way to automatically discriminate with a high level of confidence between legitimate and counterfeited images of poor quality. The point about the confidence level is important. Due to the very large number of mail pieces processed daily, the process of discrimination is statistical by nature. This means that the probability of correct identification of artificially distorted counterfeit images has to be high enough, for example 80% or 90%. Since the majority of the mailers are honest regardless of the postal verification policy, it can be reasonably assumed that a very large proportion of mail items carry a legitimate proof of payment. Thus, the majority of postage for the mail are legitimately paid. Accordingly, only a small percentage of the total mail stream may be counterfeits or illegitimate copies. If some proportions of those are generated by an artificial distortion method outlined above, a robust discrimination process can outsort a large portion of those for investigation, leaving a smaller number of undecidable pieces that can be safely accepted into the postal stream for delivery without further investigation. The monetary loss associated with undecidable and potentially counterfeited pieces is so small that it may not warrant any further investigation and the whole payment system can be considered robust and trustworthy. This outsorting process substantially improves the effectiveness of investigation of non-readable indicia.

The Method

The discrimination between artificially and naturally distorted images utilize three principles:

1. The naturally occurring defects of the printed indicium image are due to specific interaction between the printing mechanism, printing media and printing ink. Such defects are classifiable and have repeatable, measurable and statistically stable patterns.

2. The indicium printing process and image have been designed with special provisions such as specially selected print font, size of characters, etc. The indicium data contains redundancy such as error detection and correction, as well as other redundant data. Due to these special provisions taken to ensure human and machine readability, these images are readable with a high probability.

3. The statistics of naturally occurring and rare non readable images is not available to aspiring counterfeiters. It takes a long period of time and effort to collect such statistics without having exposure to a very large volume of non readable indicia. Since vendors of franking machines in possession of such data should treat it as sensitive, similar to the treatment of printing dies for conventional mechanical meters, it will not be generally publicly available.

Artificially distorted non readable images have measurable patterns statistically different from the patterns of naturally occurring images mentioned in the first principle.

Image statistics

When an image is digitized it may be represented as a collection of pixels, color, gray scale level or binary values with associated X and Y coordinates. The digital image of an indicium consists of pixels representing graphical elements and characters. The characters crucial for indicium validation may be in certain systems only numerals of certain shape, reducing the total number of shapes to be considered for recognition purpose from hundreds for a typical text reading application to 10.

The following are examples of different type of statistics:

- total number of pixels in the image with the value above a certain predetermined threshold;
- number of pixels of a certain value in prespecified positions;
- average number of pixels of a certain value in each character shape;
- maximum number of pixels of a certain value in each character shape;
- minimum number of pixels of a certain value in each character shape;
- average number of pixels of a certain value in each graphical element;
- maximum number of pixels of a certain value in each graphical element;
- minimum number of pixels of a certain value in each graphical element;
- total number of pixels of a certain value in each graphical element.

Process: Designing Classifier

1. Collect and digitize a representative sample of human non readable images.

2. Compute image statistics (of the type described above).

3. Compute statistical parameters for the statistics: such as mean values, correlation's, dispersions, standard deviations.

4. Classify the results and define a statistical pattern recognition algorithm based on the computed parameters (features) selected from the set of all computed statistical parameters based on their discriminating power.

This last process can be implemented in a classical fashion, i.e. when the process of features selection is guided by a human designer and then one of the traditional classifiers is employed (see for example, Handbook of Pattern Recognition and Image Processing, ed. by T. Young and K. Fu, Academic Press, 1986).

Alternatively, a neural network approach can be very effective for this particular application. In this case a three layer network can be employed. The first layer consists of the number of input nodes equal to the number of preselected image statistics, for example 30 for each character shape, 9 for graphic elements and 3 for total number of pixels, that is 42 input nodes. The intermediate level may have, for example, 10 nodes. On how to select the intermediate level see for example, R. Hecht-Nielsen, Neural Networks, Addison-Wesley, 1991. The output layer consists of two nodes, corresponding to human readable or human nonreadable. Such network can then be trained with a supervision on the basis of a collected sample of readable and non readable images. In such training, the supervisor presents the network with input data together with the correct result (readable, nonreadable). The process converges to a stable state, when weights assigned to connections between nodes are stable and assigned certain values. The process of training, for example, can employ a known algorithm of back propagation of errors (see, R. Hecht-Nielsen, Neural Networks, Addison-Wesley, 1991). After training, the network is employed to classify real images, which were not a part of the initial training set. One interesting method of using network is to "interrogate" the network, upon conclusion of the training process as to which inputs were deciding factors during the classification process. In practice this means listing connection weights between the nodes in descending order and selecting inputs contributed most to these weights. Once that is done, the selected inputs then can be used as features in a conventional statistical classifier. In such manner, the computing resources required to classify images can be minimized, since conventional classifiers are typically more computationally effective than neural networks. The process can also be implemented without a neural network by cataloging the various types of illegible printed data. These categories include printed data intentionally made illegible.

Target System and Process

Once a classifier has been designed and implemented, it can be employed in the image validation system.

System Organization And Operation

Reference is now made to FIG. 1. A series of mail piece shown generally at 102 are placed on a mail transport 104. The mail pieces contain an indicia having a validation code. This has been termed an encrypted indicia. The encrypted indicia may contain digital tokens used in the validation process. Indicium data must be recovered to verify the proof of payment imprinted on the mail piece. The data necessary to do this is dependent on the form and architecture of the cryptographic process utilized. Encrypted and non-encrypted information needs to be recovered to initiate most validation processes. The mail pieces 102 are transported past a scanner 106 by mail transport 104. The scanner scans necessary information from the mail piece to enable the validation process to proceed and for other purposes in connection with the mail processes. In one embodiment, the scanner may capture and digitize the image of the indicium for subsequent processing.

If the information recovered by the scanner 106 is inadequate for computer recognition unit 108 to correctly process the data, the captured digitized image may be sent to a key entry unit 110 when a determination has been made that the captured image is likely to be human readable.

If the captured digitized image is sent to a key entry unit 110, the mail piece involved may be held in the buffer station 111 while the key entry process is implemented. In either event where the computer recognition unit 108 has sufficient information or where the mail pieces sent to the key entry unit and sufficient information is recovered, the data is sent to a cryptographic validation processor unit 112. The processor unit 112 determines, based on the available data from the mail piece, whether the printed indicia is valid. After this process has been completed, the mail pieces proceed, either along the transport or from the buffer station to a sorting station 114 to be sorted based on the determination made by the cryptographic validation processor unit 112 to either a first sortation bin 116 for accepted mail which will be put into the mail delivery stream or to sortation bin 118 where the cryptographic process has indicated that the mail piece has an invalid imprint. In such an event, this is a cryptographic indication of an invalid mail piece which is a fraudulent mail piece in that the data recovered from the mail piece is internally inconsistent.

A third category of mail is still present in the mail stream. This is mail where the mail piece data is not machine recognizable nor is it human readable. This mail is processed to be sorted by mail sorting station 114 into either first sortation bin 116 of accepted mail or into a third sortation bin 120 for mail requiring further investigation. This mail bin 120 is reserved for mail pieces which are likely fraudulent but require further investigation because of the inconclusive nature of the recovered data.

It is expected in general that the number of pieces where the indicia is illegible will be relatively small and the mail processing system as described herein further reduces the number of mail pieces sorted into sortation bin 120 by allowing mail pieces that are likely not fraudulent to be accepted.

Reference is now made to FIG. 2. It should be expressly recognized that various encrypted data including alpha numeric and graphical representations, such as bar code, may be employed in the present invention. The following description is merely for the purpose of illustrating but one of many examples of how the present process may be implemented.

Figure 2A:
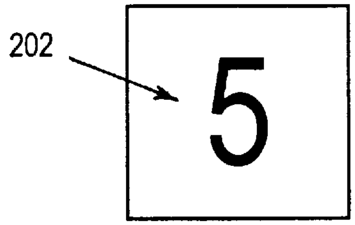
FIGS. 2 *a–g* are a series of depiction's of various portions of a numeric character which maybe part of an encrypted indicia helpful in a full understanding of the present invention.
Figure 2B:
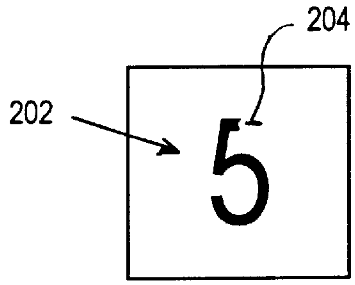

FIG. 2*a* depicts an image of the numeral 5 which is shown at 202 as a completely formed defect free numeral. That is, all of the graphical elements necessary to fully represent the numeral are present. FIG. 2*b* depicts the same numeral "5" where, a portion of the image is missing. Specifically, the top most right hand portion shown at area 204 is not present. This means the upper right most portion of the image contains no imprinted pixels (no black dots or markings for that portion of the image).

Figure 2C:
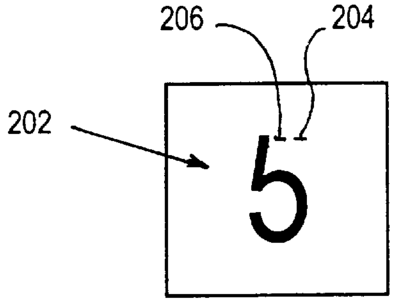

Reference is now made to FIG. 2*c*. The numeral "5" now has an additional area 206 missing from the numeral "5."

Figure 2D:
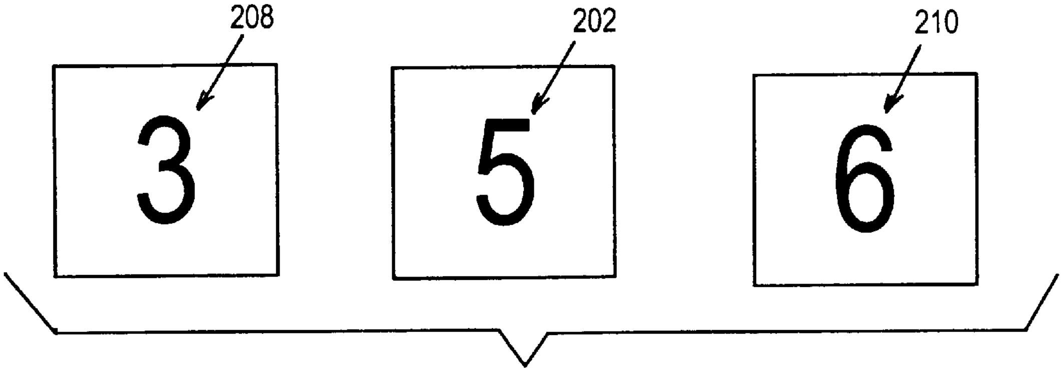

Should the validation system in FIG. 1 recover an image of a numeral such as shown in FIG. 2*c*, for the particular numeral type set being utilized, three possibilities might exist. The recovered numeral intended to be printed could be a "3" as shown at 208, could be the original numeral "5" as shown at 202 or might be the numeral "6" as shown at 210. Based on the recovered information of elements in FIG. 2C, any of the possibilities shown in FIG. 2D are potentially plausible.

Figure 2E:
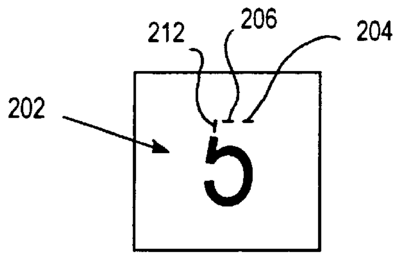

Further information may be eliminated from the originally imprinted numeral "5" as shown in FIG. 2*e* causing further difficulties.

At FIG. 2*e*, the numeral "5" has a further area 212 missing from the imprint. However, as shown in FIG. 2*f*, yet further information can be eliminated from the imprint, specifically the area 214.

At this point, four possibilities are now plausible. The four possibilities are shown in FIG. 2*g*.

Figure 2F:
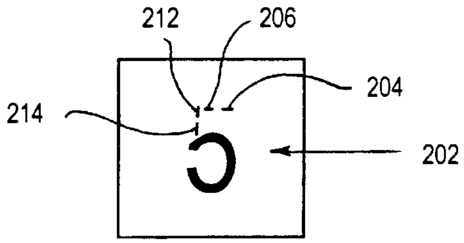
Figure 2G:
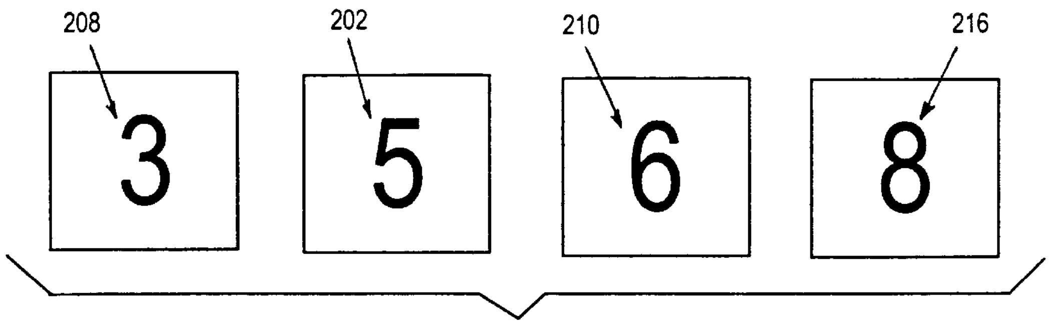

The originally imprinted numeral "5" with the pixel elements missing as shown in FIG. 2*f* make it plausible that that the intended imprinted number could have been a 3 as shown at 208, a "5" as shown at 202, "6" as shown at 210 and now, additionally, an "8" as shown at 216.

Figure 3:
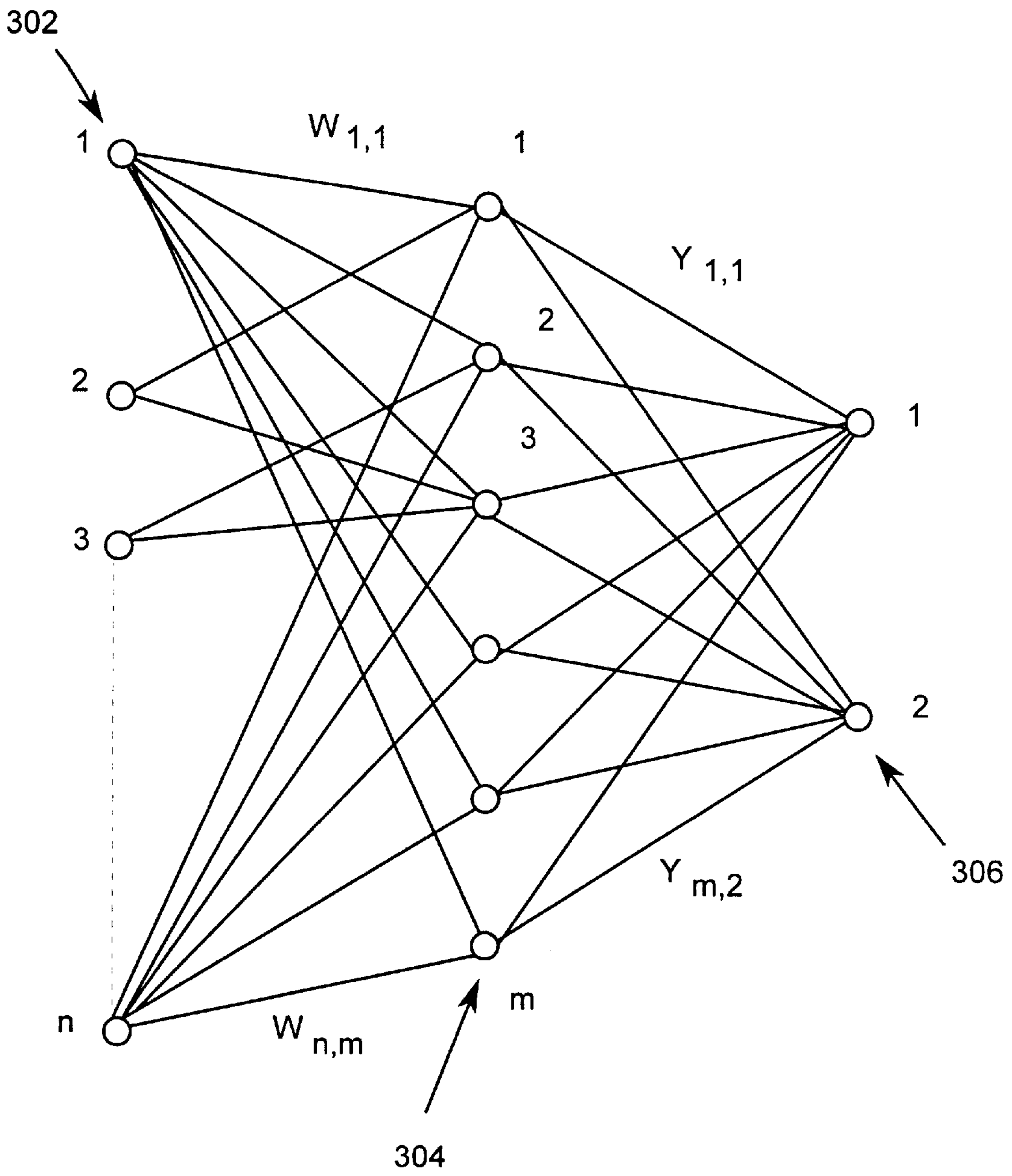
FIG. 3 is a diagrammatic representation of a neural network system helpful in one form of implementation of the present invention.

Reference is now made to FIG. 3. A standard neural network system is employed to determine the characteristics of human readable and non human readable indicia. This is done through an iterative process of learning through a supervisor guided learning process. In such a process human intervention is included to provide the right identification (human readable or human non readable) for the network based on the input indicia for the data set involved.

The training of the neural network is partially dependent upon having a set predetermined number of parameters which do not vary. For example, the processing of the neural network to determine readability or non-readability, human readability or non-readability is based on a particular printer and equipment, a particular scanner and printer. The variables include the interaction of the inks with large varieties of papers; however, since the other variables are stable, an iterative neural network learning process can be implemented to improve the decision making process and accepting and rejecting mail pieces. This makes the universe of different factors which could impact the decision more limited and therefore manageable.

It should be recognized that the relevant image statistics and the weights in the network obtained as a result of the neural network tracking process depend on the particular scanner involved and the digitization process and the particular indicium printing equipment employed. Therefore it may be necessary to retrain the neural network where these or other relevant factors change.

The data set to the input layer nodes 1-n shown generally at 302 may include, for example, the following data concerning an indicia. These may be input at 302 via the various input layer nodes 1-n and may be comprised of the following:

1. The total number of pixels in the image with a value above a certain predetermined threshold. That is, if the pixels have different intensity levels (gray scale values) the various pixels above a certain predetermined threshold level can be counted.
2. The number of pixels in the indicium of a certain value in pre-specified positions.
3. The average number of pixels of a certain value in each character shape.
4. The maximum number of pixels of a certain value in each character shape.
5. The minimum number of pixels of a certain value in each character shape.
6. The average number of pixels of a certain value in each graphical element, that is, the pixel values in the graphical as opposed to character element of the indicium.
7. The maximum number of pixels of certain value in each graphical element.
8. The minimum number of a certain pixel value in each graphical element.
9. The total number of pixels of a certain value in each graphical element.

It should be expressly recognized that this list of input data to the input layer nodes of the neural network system can be greatly expanded and/or be different from those selected for the purpose of the following example.

The neural network system includes an intermediate layer shown generally at 304. The intermediate layer computes a sum of the inputs times the weight. This is, again, processed to an output layer shown generally at 306 to ultimately formulate the characteristics of human readable and human nonreadable indicium. It should, of course, be recognized that there could be any number of intermediate layers. The neural network may operate, for example, as described in the text Neural Networks by R. Hecht-Nielsen identified above. In the following example of the neural networks, it should be recognized that in the neural network each layer is connected to a preceding layer and the subsequent layer in the network. In that connection, each node is connected to other nodes in the preceding or forwarding layer and the connection between the nodes is defined by a weight associated through this connection as is shown if FIG. 3.

Figure 4:
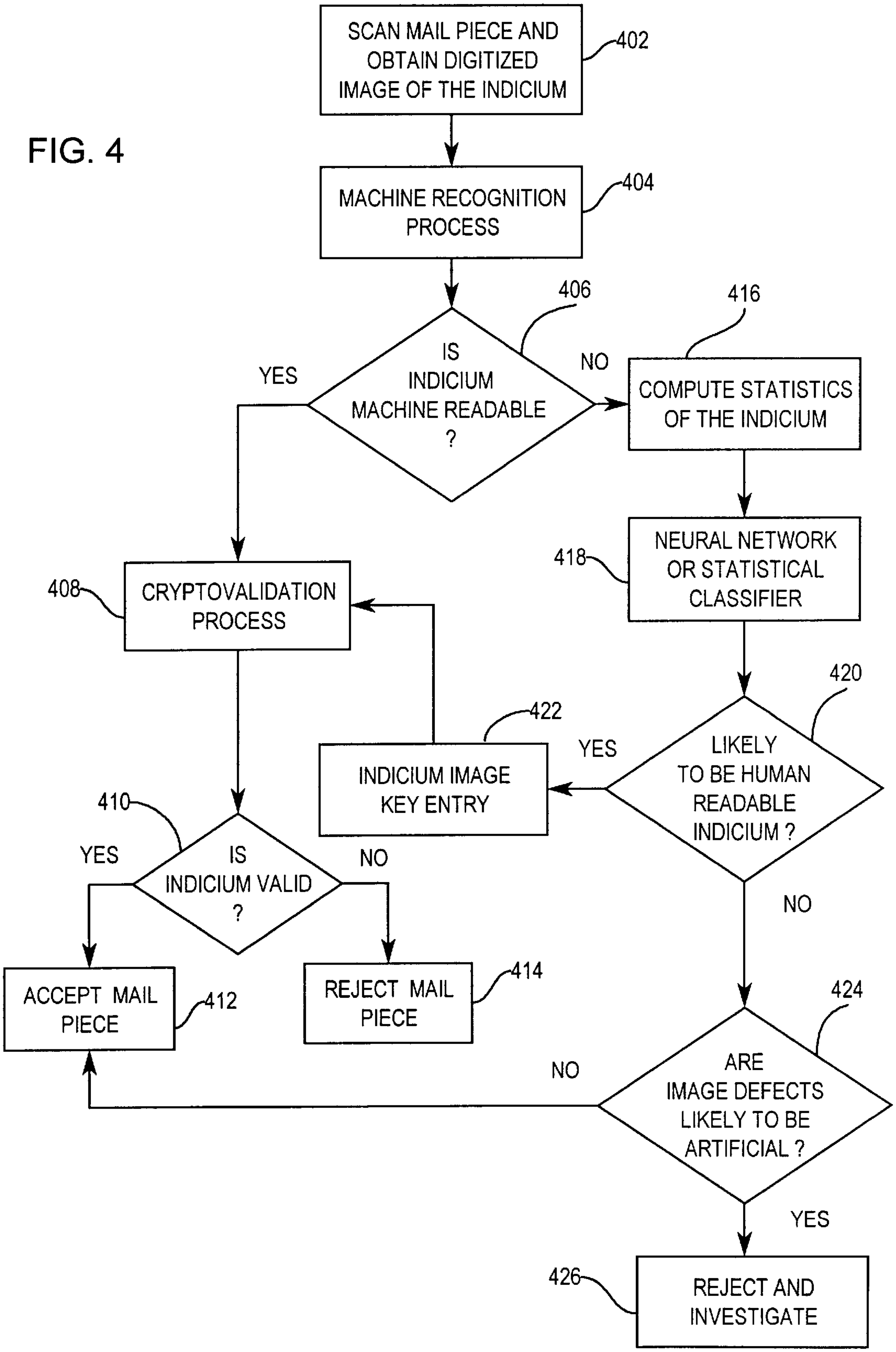
FIG. 4 is a flow chart of the system shown in FIG. 1.

Reference is now made to FIG. 4. A mail piece is scanned and a digitized image of the indicium obtained at 402. The recovered image is subjected to a machine recognition process at 404. A determination is made at 406 if the indicium is machine readable. If the indicium is machine readable, the data is sent to a crypto validation process at 408. A determination is made at 410 if the processed indicium is valid. If it is valid, the mail piece is accepted at 412. The mail piece is then placed in the mail delivery stream. If the indicium is determined as not valid, the mail piece is rejected at 414.

For an indicium determined as not being machine readable, statistics of the indicium are computed at 416. These statistics are subjected to neural network or statistical classifier processing at 418. A determination is made at 420 whether the indicium is likely to be human readable, that is, the likelihood of the indicium being readable is high, the indicium data image is sent for key entry at 422. The key entered indicium data is thereafter processed at 408 and the process continues as previously noted.

Where the indicium is not likely to be human readable, a determination is made at 424 whether the image defects are likely to have been created artificially. If the image defects are determined not to be artificial, the mail piece is accepted at 412. If, on the other hand, the image defects are determined likely to be artificial at 424, the mail piece is rejected and subject to further investigation at 426. These mail pieces are subject to further investigation to determine whether fraud or other improper activities have been involved in creating the indicium.

It should be clearly recognized that the decisions as explained above regarding expected readability of the indicium image is, of course, a statistical one. In other words, the neural or traditional classifier will return a yes/no/do not know decision with a certain confidence level. The normal process of accepting or rejecting the decision based on confidence level is then employed based on predetermined (by policy decision) level of threshold. If the confidence level is below the threshold level, the mail piece can be diverted for manual inspection. As a result of such inspection, if the image is deemed to be a human nonreadable mail piece, it can either be accepted or rejected depending on revenue protection policy. More specifically, the determination made in decision box 406 is deterministic. Either the indicium is machine readable or it is not machine readable. On the other hand, the decisions made in decision box 420 and 424 may be statistically determined. Alternatively, these determinations may be made as a result of review and classification of various non-machine readable indicia. The level of these determinations, this is the yes/no decision, may be formulated by policy considerations as to revenue protection and the level of confidence required to allow mail to be accepted at block 412.

It should be recognized that the method and system described above is applicable to other coding systems, including all forms of bar code. In the case of bar codes, the indicium includes several types of redundancy. The geometric structure of the bar code allows locating particular code words. This structure includes a target to help the scanner locate and determine the size and format of the bar code, and a specific lattice structure of the image. Each code word within the bar code includes redundant data, possibly linked to the location of the code word within the symbol. The bar code usually also includes substantial error detection and correction code. The data included in the bar code is redundant, for example, the date contains redundant data and the postal origin is determined by the meter number through a meter database. The mail piece and indicium may contain human readable, and OCR readable data that is included in the bar code. The verification system can check the consistency of this human readable data with partial data from the bar code.

The verification system can employ the redundancies noted above to detect deliberately fraudulent non readable indicia, as well as to help partially decode symbols not readable with a standard decode algorithm. For example, PDF417 has three distinct clusters of code words, and substantial structure within a code word. The three clusters are used sequentially in separate rows. The verification system can check that code words are consistent with their rows. An attacker may smear the bar code. A naturally occurring smear is unlikely, in a well designed system to hide all the information and redundancy. The verification system can still detect inconsistencies in the image.

An attacker may alternatively omit printing part of an image, imitating nozzle blockage in an ink jet printer or printing over a thickness variation with a thermal transfer printer. Naturally occurring faults of this type are unlikely to completely obliterate the indicium information, so again in this case, the redundancy can be detected.

While the present invention has been disclosed and described with reference to the specific embodiments described herein, it will be apparent, as noted above and from the above itself, that variations and modifications may be made therein. It is, thus, intended in the following claims to cover each variation and modification that falls within the true spirit and scope of the present invention.

What is claimed is:

1. A method for processing mail pieces containing data printed thereon, comprising the steps of:

a. scanning a mail piece to obtain information concerning said data printed on said mail piece;

b. processing said information to determine if said data is machine readable;

c. processing non machine readable data information using statistical analysis to determine if said non readable data is due to predetermined of causes of a naturally occurring type or predetermined causes of a artificially created type.

2. The method as defined in claim 1 further comprising the steps of:

processing mail pieces with non readable data due to predetermined of causes of said naturally occurring type in a first manner and rejecting mail pieces with non readable data due to predetermined of causes of said artificially created type.

3. The method as defined in claim 2 wherein said non machine readable data comprises an indicium including bar code data.

4. The method as defined in claim 2 wherein said non machine readable data comprises an indicium including PDF417 type bar code data.

5. The method as defined in claim 2 wherein said non machine readable data comprises an indicium including optical character recognizable type data.

6. A method for processing mail comprising the steps of:

a. scanning a mail piece and obtaining a digitized image of an indicium;

b. applying a machine recognition process to the digitized image;

c. determining whether the digitized image is machine readable;

d. processing the machine readable indicium through a cryptographic validation process; and, e. processing non machine readable indicia through a statistical review process to determine whether the image defects are likely to have been intentionally created.

7. The method of claim 6 wherein the statistical review process comprises the steps of:

computing statistical data of the digitized image of the indicium;

processing the statistical data with a statistical classifier;

determining if the indicium image is likely human readable;

if likely human readable, entering indicium image information manually and determining the validity of the indicium through a cryptographic validation process;

determining whether indicium image defects causing no readability are likely artificially created;

subjecting the mailpiece to further investigation when the indicium image defects are likely artificially created.

8. The method of claim 7 wherein the step of determining the indicium image defects are likely artificially created uses a neural network system to make such determination.

* * * * *